United States Patent [19]

Ikeda

[11] Patent Number: 4,521,069
[45] Date of Patent: Jun. 4, 1985

[54] OPTICAL SWITCH

[75] Inventor: Masahiro Ikeda, Tokyo, Japan

[73] Assignee: Nippon Telegraph & Telephone Public Corporation, Tokyo, Japan

[21] Appl. No.: 364,486

[22] Filed: Apr. 1, 1982

[30] Foreign Application Priority Data

| Apr. 1, 1981 | [JP] | Japan | 56-47264 |
| Sep. 22, 1981 | [JP] | Japan | 56-148781 |
| Sep. 25, 1981 | [JP] | Japan | 56-150723 |
| Nov. 9, 1981 | [JP] | Japan | 56-178416 |
| Feb. 9, 1982 | [JP] | Japan | 57-18117 |

[51] Int. Cl.$^3$ .......................... G02B 5/174
[52] U.S. Cl. ................ 350/96.13; 350/96.14; 350/96.15; 372/50
[58] Field of Search ............ 372/50; 350/96.13, 96.15, 350/96.11, 96.14, 96.12; 357/17, 19

[56] References Cited

U.S. PATENT DOCUMENTS

| 3,952,265 | 4/1976 | Hunsperger | 372/50 |
| 4,065,729 | 12/1977 | Gover et al. | 372/50 |
| 4,316,156 | 2/1982 | Scifres et al. | 372/50 |
| 4,327,962 | 5/1982 | Redman | 350/96.15 |
| 4,376,946 | 3/1983 | Kaminow et al. | 350/96.15 |

OTHER PUBLICATIONS

Directional Coupler Switches, Modulators, and Filters Using Alternating Techniques, in IEEE Transactions on Circuits and Systems, vol. CAS-26, No. 12, Dec. 1979.

*Primary Examiner*—James W. Davie
*Attorney, Agent, or Firm*—Armstrong, Nikaido, Marmelstein & Kubovcik

[57] ABSTRACT

A semiconductor optical switch having a P-N junction with an active layer coupled with an input and output waveguides has been found. An input optical signal with the wavelength close to the center of the gain spectrum defined by said P-N junction is applied to said active layer, and said input optical signal is switched ON and OFF according to the injection current applied in said P-N junction. Said injection current for turning ON the optical switch is in the range between 80% and 90% of the threshold current which initiates oscillation operation of said P-N junction. When injection current is zero, an input optical signal does not appear at an output, and with the above injection current of 80-90% of the threshold current, an input optical signal appears at an output terminal. When a switch is in ON state, an input optical signal is amplified with some gain.

12 Claims, 15 Drawing Figures

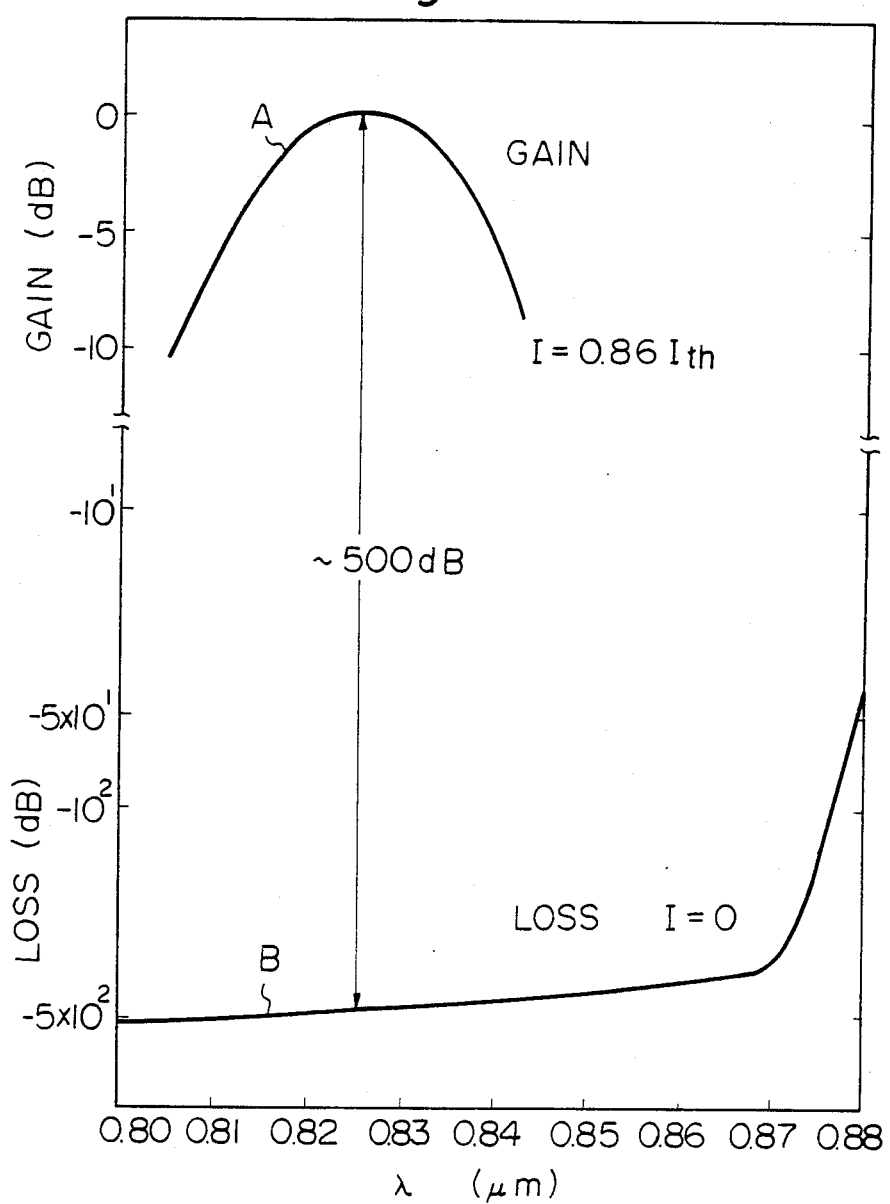

OPTICAL SWITCH

BACKGROUND OF THE INVENTION

The present invention relates to an optical switch, in particular, relates to such a switch which is small in size and switches at high speed.

FIG. 1 is one of the prior optical switches, in which the reference numeral 1 is an input optical waveguide, 2 is an output optical waveguide, 3 is a lens for providing parallel optical beam, 4 is a movable mirror. The optical switch of FIG. 1 switches an optical signal by inserting or removing mechanically a mirror in or from an optical path. Since the mechanical movement of a mirror is essential in FIG. 1, the operational speed of the switch of FIG. 1 is rather slow as a few milliseconds, and the size of a switch can not be small.

FIG. 2 is another prior optical switch of a directional coupler type, in which the reference numeral 5 is an electrode, 6 is an electro-optic crystal, for instance, $LiNbO_3$ or $LiTaO_3$ for controlling the coupling degree of a directional coupler. The optical switch of FIG. 2 has the disadvantages that (1) cross talk level is high, for instance the cross talk level reaches even $-10$ dB or $-20$ dB, (2) the allowable manufacturing error is very severe, (3) a DC bias voltage is necessary, (4) an insertion loss is large, and (5) a long substrate is necessary when a large scale equipment is constructed.

Another prior optical switch uses a liquid crystal or electro-optical reflector as shown in West Germany Auslegeschrift No. 2238336, and U.S. Pat. No. 4,065,729. The former performs an optical switching through the control of polarization, but has the disadvantage that the switching speed is very slow, and it takes about 50 msec for each switching. The latter performs the optical switching through the control of the refractive index, but has the disadvantages that cross talk level is high, the insertion loss is high, and the voltage for performing the switching must be high.

Another prior optical switch is shown in the article "Electroabsorption in $Al_yGa_{(1-y)}As-Al_xGa_{(1-t)}As$ double heterostructures" by F. K. Reinhart, in Appl. Phys. Letters, vol. 22, pp. 372-374, 1973. This switch uses the Franz-Kerdish effect, and has the nature of high speed switching. However, it has the disadvantages that the isolation is poor, and the insertion loss is large.

Another prior optical switch is shown in the article "Design and development of a high-speed electro-optic A/D converter" by F. J. Leonberger, et al, in IEEE Trans. CAS-26, pp. 1125-1131, 1979. This switch has the nature that the switching speed is high, but the isolation is poor, it needs DC bias voltage, the insertion loss is high and it has the polarization dependence of switching.

Another prior optical switch is an optoelectronic switch, which has a photo-diode. The switching of the bias voltage of the photo-diode performs the switching from an optical signal to an electrical signal. This switch has the nature of the wideband, the high isolation, and the high speed switching operation, but has the disadvantage that an output electrical signal must be converted to an optical signal further for providing an optical switch.

SUMMARY OF THE INVENTION

It is an object, therefore, of the present invention to overcome the disadvantages and limitations of a prior optical switch by providing a new and improved optical switch.

It is also an object of the present invention to provide an optical switch element which is small in size, operates with high speed, has long life time, has wide frequency band, and has small insertion loss.

The above and other objects are attained by an optical switching element having a semiconductor substrate; a P-N junction having P-type semiconductor layer and N-type semiconductor layer and an active layer coupled with at least one of said N-type layer and said P-type layer, said P-N junction being mounted on said semiconductor substrate; means for coupling said active layer with optical waveguides, means for applying injection current in said P-N junction for switching an input optical signal, and wavelength of an input optical signal being selected to be close to the center of the gain spectrum defined by the structure of said P-N junction.

Preferably, an injection current when the switch is ON, is in the range between 90% and 80% of the threshold current which starts oscillation and an injection current when the switch is OFF is zero.

BRIEF DESCRIPTION OF THE DRAWINGS

The foregoing and other objects, features, and attendant advantages of the present invention will be appreciated as the same become better understood by means of the following description and accompanying drawings wherein:

FIG. 4B shows the gain spectrum curve of the present optical switch.

DESCRIPTION OF THE PREFERRED EMBODIMENTS

Figure 1:
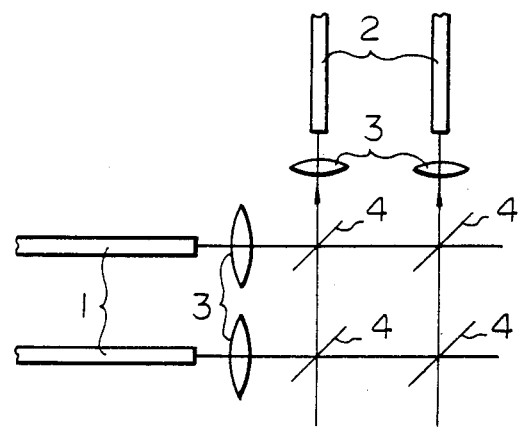
FIG. 1 shows the structure of a prior optical switch.
Figure 2:
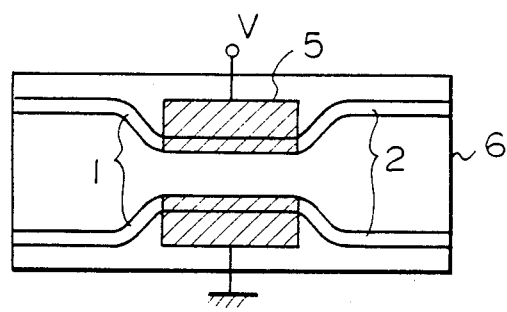
FIG. 2 is another prior optical switch.
Figure 3:
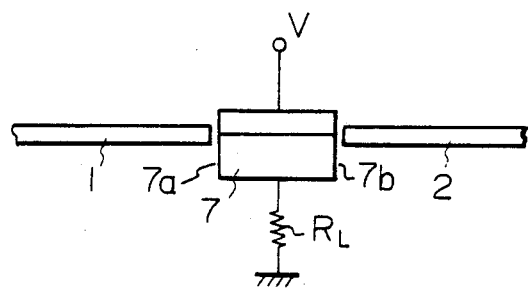
FIG. 3 shows the brief structure of the present optical switch.

FIG. 3 shows the brief structure of the present optical switch element, in which the reference numeral 1 is an input optical waveguide, 2 is an output optical waveguide, 7 is a P-N junction device, V is the bias voltage source, $R_L$ is a load resistor. Preferably, the extreme ends 7a and 7b of the laser 7 are coated with dielectric thin film so that the reflection coefficient of those ends is less than 0.1%, and the length L of the P-N junction device 7 is less than 300 μm, and still preferably, that length L is less than 100 μm.

When the bias voltage turns ON or OFF the P-N junction device 7, the optical switch is turned ON or OFF.

Figure 4A:
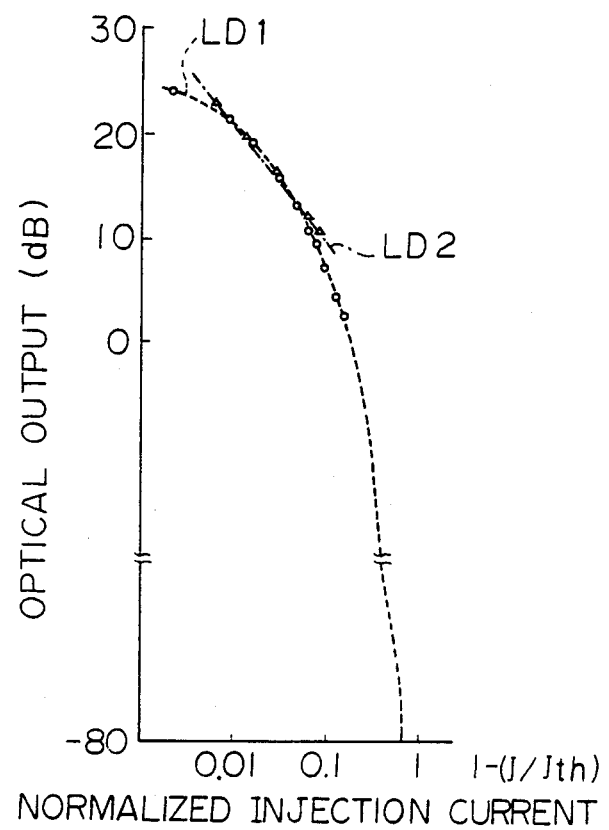
FIG. 4A shows the curves between the current and the optical output of a semiconductor laser amplifier for the explanation of the operation of the present invention.

FIG. 4A shows the curve of the relation between the injection current applied to the semiconductor laser amplifier (horizontal axis), and the optical output power (vertical axis), for the two test samples LD1 and LD2, (see the article "The gain, gain saturation and noise of a semiconductor laser amplifier" by Mukai et al, in OQE 80-71 in the study report of the Institute of Electronics and Communications of Japan). The current in the horizontal axis in FIG. 4A shows in the form of the normalized current in which an actual current is divided by the threshold current which starts the oscillation of the laser. As apparent from FIG. 4A, when the injection current J is close to the threshold current $J_{th}$ of the semiconductor laser amplifiers $LD_1$ and $LD_2$, the gain of the laser amplifier is almost 20 dB, on the other hand, when the injection current is zero, the P-N junction device gives an attenuation over 80 dB. Accordingly, by switching an injection current between 0 and the current close to the threshold current, an optical switching is performed, and the isolation (difference between the gain at ON state and the loss at OFF state) of the present optical switch element is higher than 100 dB. The threshold current of the typical semiconductor laser amplifier is 60 mA, and the high speed switching in less than 10 nsec is performed. The bandwidth of a semiconductor laser amplifier is wider than 1 GHz, which is enough for wideband communications.

Since a semiconductor laser amplifier element is used as an optical switching element in the present invention, a switching between optical signal and optical signal is possible, and further, since an element has a gain, an insertion loss is small, and the cross talk level is low. Further, since no mechanical member is used, high speed switching operable in wide frequency band is possible.

FIG. 4B shows the gain spectrum curve of the present optical switch, in which the horizontal axis shows the wavelength of an input optical signal, and the vertical axis shows the gain at ON state, and the loss at OFF state. The curve A is the experimental curve with the semiconductor structure of FIGS. 8-10 in which the length L of the optical switch along the path of the optical signal is 300 μm, and the injection current I is $I=0.86I_{th}$, where $I_{th}$ is the threshold current for the start of the oscillation of the P-N junction. Preferably, the injection current I is less than 90% of the threshold current $I_{th}$ and is larger than 80% of the threshold current $I_{th}$ for providing the stable switching operation, the enough gain, the enough bandwidth and the satisfactory saturation characteristics of an input optical signal. As apparent from the curve A, the 1 dB-down bandwidth is wider than 100 Å, that is to say, the bandwidth with the gain deviation 1 dB is wider than 100 Å.

The curve B of FIG. 4B is the calculated curve when the switch is in OFF state, in which the injection current I is zero. As apparent from FIG. 4B, the isolation between the gain when the switch is in ON state and the loss when the switch is in OFF state reaches even up to 500 dB.

The wavelength of an input optical signal is selected so that it is close to the center of the gain spectrum curve A of FIG. 4B, and in the embodiment, the preferable wavelength is 0.825 μm. The center of the gain spectrum is determined by the semiconductor material used, and the component ratio of said semiconductor material.

Figure 5:
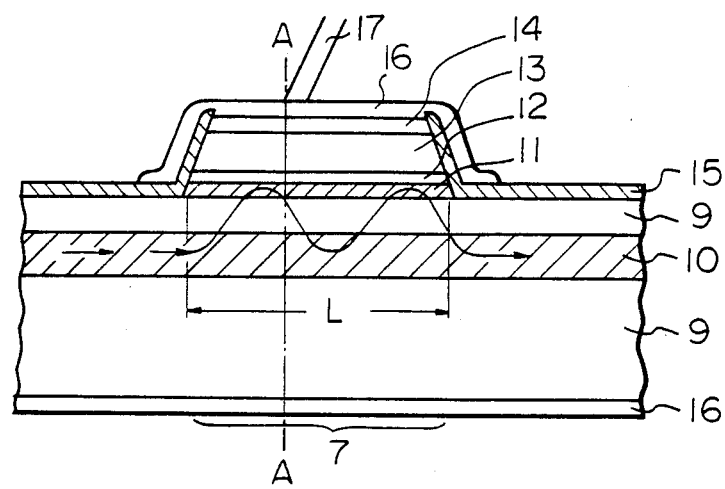
FIG. 5 is the cross section of the present optical switch.
Figure 6:
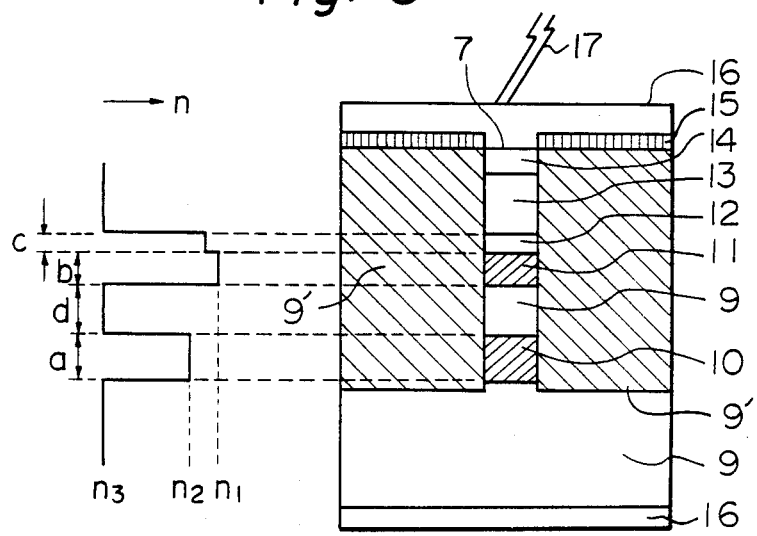
FIG. 6 is the cross section along the line A—A of FIG. 5.

FIG. 5 shows the structure of the detailed embodiment of the present optical switching element, in which a P-N junction element is used as a switching element. FIG. 6 is the cross section along the line A—A of FIG. 5.

The switching element of FIGS. 5 and 6 operates at about 1.55 μm of wavelength in which the optical loss in silica fibers is minimum.

In those figures, the reference numeral 9 is an N-type semiconductor crystal made of InP, 10 is an N-type semiconductor crystal made of GaInAsP for providing a waveguide. The refractive index and the bandgap energy of the waveguide 10 are designed properly by selecting the ratio of each of the components of the semiconductors. The reference numeral 11 is an active layer coupled with a P-N junction, and is made of intrinsic GaInAsP semiconductor crystal, 12 is a P-type semiconductor crystal made of GaInAsP and is called an anti-melt back layer for the succeeding growth of a crystal. The reference numeral 13 is a P-type semiconductor crystal made of InP, 14 is a P-type semiconductor crystal made of GaInAsP and is called a cap layer which provides the electrical contact between the semiconductor element and an electrode. The reference numeral 15 is an insulation layer made of $SiO_2$ for providing a stripe shaped electrode. The reference numeral 16 is an electrode made of Au, and 17 is a lead wire coupled with the electrode 16.

The structure of FIGS. 5 and 6 is the buried type hetero junction structure, and is manufactured through a similar process to that of a conventional semiconductor laser. First, each layer in FIG. 5 from the layer 9 to the cap layer 14 are provided through a crystal growth process, and then, a desired waveguide pattern is provided through an etching process for said semiconductor product. When a waveguide has a curved portion, said etching process is performed by an active sputter etching using $CCl_2F_2$, Ar, $O_2$ gas et al. Next, an N-type InP layer 9' is grown on both the sides of the waveguides through the crystal growth process, and the structure of FIG. 6 is obtained.

The refractive index in each of the layers in the structure of FIG. 6 is shown on the left portion of FIG. 6. The relations between the gap energy and the refractive index, and the ratio of each of the components in GaInAsP is described in the article "Band gap versus composition and demonstration of Vigards law for $In_{(1-x)}Ga_xAs_yP_{(1-y)}$ lattice matched to InP" by R. E. Nabory, M. A. Pollack and W. D. Johnstorn, Jr. in Appl. Plys. Lett., Vol. 33, pp. 659–661, Oct. 1978. For instance, the refractive index of $n_1=3.53$, $n_2=3.36$, $n_3=3.16$ are obtained, and the wavelength relating to the bandgap energy for a waveguide can be 1.4 μm, and the wavelength relating to the bandgap energy for an active layer can be 1.55 μm at which the gain spectrum provides the maximum gain, are obtained by selecting properly the ratio of the semiconductor components.

As apparent from FIG. 5, the active layer 11 couples optically with the waveguide 10 at the element shown by the reference numeral 7 in FIG. 6. The structure of FIG. 5 is manufactured by removing the portion except the optical switching element 7 after the complete crystal growth, and attaching the semiconductors 9 and 9' which has the same components as 9, the insulation layer SiO$_2$ and the electrode.

Figure 7:
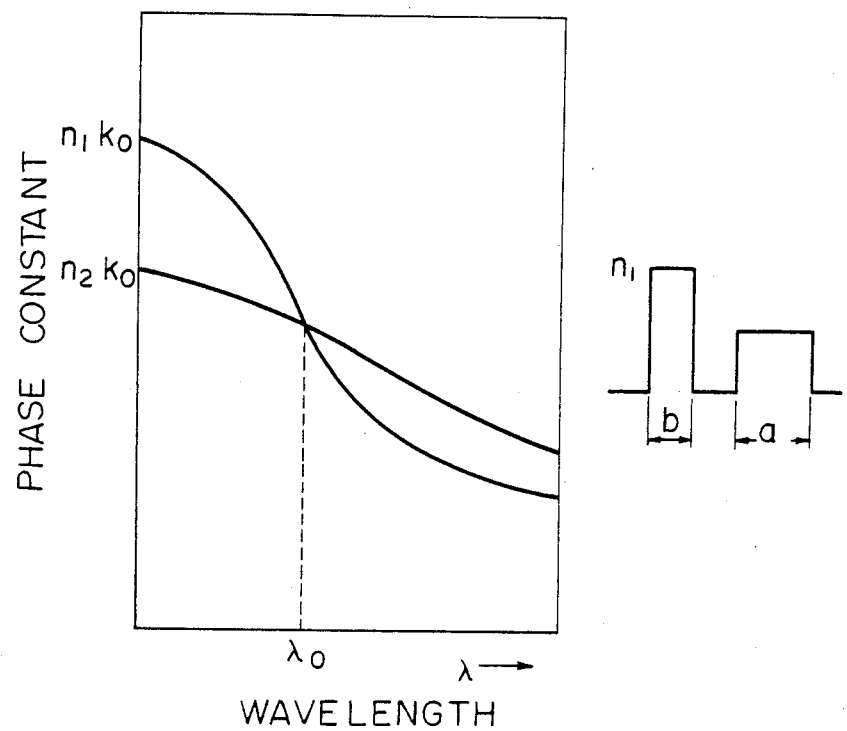
FIG. 7 shows the relation between the wavelength and the phase constant of a coupling optical waveguide.

The refractive index, and the size of each portion in FIGS. 5 and 6 are designed so that the waveguide 10 couples optically with the active layer 11. An optical power propagating in the waveguide 10 couples with the active layer 11, that is to say, an optical power goes from the waveguide 10 to the active layer 11, and returns to the waveguide 10 again, repetitively. The coupling length L of a switching element is determined to be N$\pi$/C, where N is an integer larger than 2 and C is the coupling coefficient between two paths 10 and 11, so that said exchange of the power between the two paths 10 and 11 is accomplished. When the refraction index of the waveguide 10 is different from that of the path 11, the phase constant of the first path 10 coincides with that of the second path 11 at the determined wavelength $\lambda_0$, and the complete optical coupling condition is obtained. FIG. 7 shows that complete coupling state. In FIG. 7, K$_0$ is the wave number in vacuum, and satisfies K$_0$=2$\pi$/$\lambda$, where $\lambda$ is wavelength. The relations among the refractive index, size, and the wavelength in each optical path or waveguide is described by H. F. Taylor, in "Optics Communications", Vol. 8, pages 421-425, Aug. 1973. For instance, by designing the lengths a=0.55 $\mu$m, b=0.2 $\mu$m, c=0.1 $\mu$m and d=0.4 $\mu$m (see FIG. 6), the complete coupling condition is obtained around the wavelength $\lambda$=1.55 $\mu$m.

Now, the switching operation is described. An optical signal with the wavelength 1.55 $\mu$m transmits in a waveguide with small loss, as no absorption exists in a waveguide. At the switching element portion 7 which has a PN junction, if an injection current is zero, an optical signal is attenuated in the switching element 7 since the active layer 11 has the large fundamental absorption, and no optical output signal is obtained. On the other hand, when an injection current is applied to the PN junction 7, the active layer 11 operates as an amplifier means, and therefore, an input optical signal is amplified every time the input power couples with the active layer 11, and the amplified optical signal is provided at the output of the switching element 7.

Further, when a coupling between an active layer and a waveguide is not complete, the present element can accomplish a switching operation. When the wavelength of a signal is $\lambda_0$, the phase condition is not satisfied, and no complete coupling condition is satisfied, the electrical field of an input signal is spread in an active layer. Accordingly, when an injection current is OFF, the power spread in an active layer is absorbed and attenuated in an active layer. On the other hand, when an injection current in ON, the power spread in an active layer is amplified in an active layer, and therefore, the power in a waveguide increases. Thus, the switching operation is possible even when no complete coupling is accomplished, if no high gain is necessary.

Accordingly, by switching an injection current, an optical switching in a waveguide 10 is accomplished. It should be appreciated that a switching element 7 made of PN junction can be mounted on the same substrate as that of a waveguide for input and/or output to and from said optical switching element.

Some of the specific advantages of the structure of FIGS. 5 and 6 are enumerated below.

(1) The cross talk level in which a signal affects to other signal paths is low.
(2) The insertion loss of a switching element is low.
(3) The high speed switching is possible.
(4) The size of a switching element is small.
(5) The bandwidth is wide.
(6) The producing cost is low since a switching element is produced through a semiconductor manufacturing process together with the related waveguides.
(7) The stable characteristics are obtained, as both a switching element, and the related waveguides are mounted on a common substrate.
(8) The unnecessary spontaneous emission generated in an active layer is removed through the filtering function of a coupling.
(9) The life time is almost forever.

Figure 8:
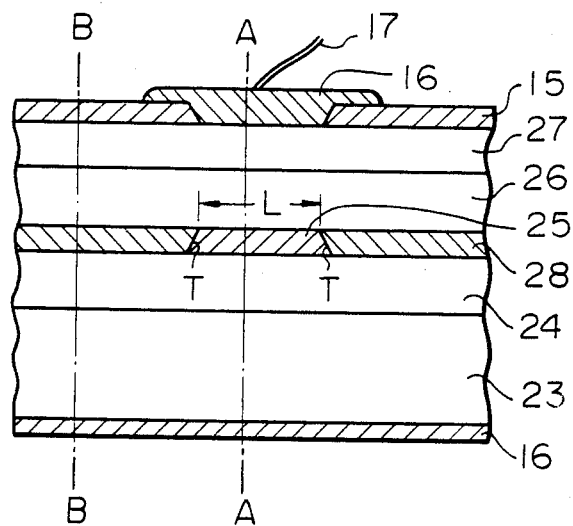
FIG. 8 is the cross section of another embodiment of the present optical switch.
Figure 9:
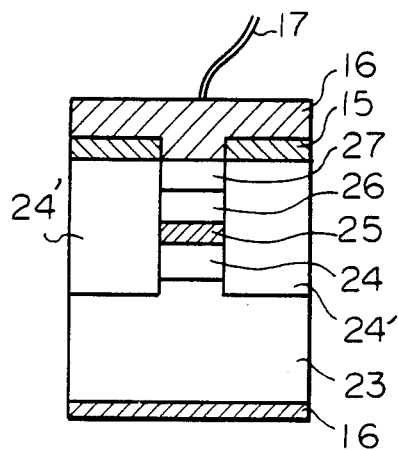
FIG. 9 is the cross section along the line A—A of FIG. 8.
Figure 10:
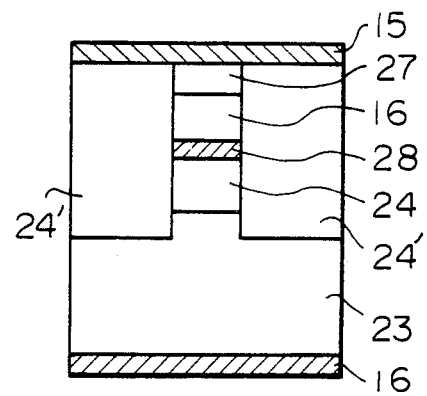
FIG. 10 is the cross section along the line B—B of FIG. 8, FIG. 11A, FIG. 11B and FIG. 11C are the configuration of the optical switches for providing an actual switching matrix.

FIGS. 8, 9 and 10 show another embodiment of the structure of the present optical switch element, in which FIG. 8 is the cross sectional view along the longitudinal direction of a waveguide, FIG. 9 is the cross section along the line A—A of FIG. 8, and FIG. 10 is the cross section along the line B—B of FIG. 8. The structure of FIGS. 8 through 10 has the feature that an active layer is positioned in a waveguide, and has the advantages that some manufacturing error in size of each portion is allowed without deteriorating switching characteristics.

In those figures, the reference numeral 15 is an SiO$_2$ insulation layer, 16 is an electrode, and 17 is a lead wire. The embodiment of those figures uses a substrate of GaAs. The reference numeral 23 is an N-type GaAs, 24 and 24' are N-type Al$_x$Ga$_{(1-x)}$As, where x satisfies 0$\leq$x$\leq$1, 25 is an active layer made of GaAs, 26 is a P-type Al$_x$Ga$_{(1-x)}$As, 27 is a cap layer made of P-type GaAs, and 28 is an optical path made of Al$_y$Ga$_{(1-y)}$As, where y satisfies 0$\leq$y$\leq$1.

It should be appreciated that the junction of the waveguide 28 and the active layer 25 is tapered as shown by the symbol T in FIG. 9, and that waveguide 28 and the active layer 25 are positioned in the common plane.

The structure of FIGS. 8, 9 and 10 is similar to that of a laser of a double-hetero buried type, and therefore, an input optical signal is switched ON and OFF according to the switching of an injection current. The preferable thickness of the active layer 25 is about 0.2 $\mu$m. When the value (x) is selected to be about x=0.4, the oscillation wavelength with the structure of FIGS. 8 through 10 is about 0.87 $\mu$m. Therefore, the wavelength of an input optical signal is designed to be 0.87 $\mu$m. The gain spectrum of FIG. 4B has the maximum level when the wavelength is 0.825 $\mu$m which is different from 0.87 $\mu$m, because the component ratio of semiconductors of the experiment of FIG. 4B is different from the above data.

On the other hand, the value (y) in the component of the waveguide 28 is selected to be about y=0.2.

It has been known that the relations between the bandgap energy E$_g$ and the refractive index n, and the ratio (y) of the material Al$_y$Ga$_{(1-y)}$As are shown below.

$$E_g = 1.424 + 1.226y + 0.26y^2$$

$$n = 3.6 - 0.7y$$

When y=0.2, the value of $\lambda_b$ which is the wavelength calculated from the bandgap energy, and the relative refractive index difference $\Delta$ which is defined by the refractive index of the waveguide, and the refractive index of the medium around the waveguide, are obtained by the equations below.

$$\lambda_b = hc/E_g$$

$$\Delta = (n_{y=0.2} - n_{y=0.4})/n_{y=0.2}$$

where h is a Planck's constant, c is a light velocity. From the above equations, $\lambda_b = 0.68$ μm, and $\Delta = 4\%$ are obtained. Since an optical signal wavelength 0.87 μm is longer than that value 0.68 μm, the energy of an optical signal is smaller than that of $\lambda_b$. Therefore, the optical signal is not attenuated or absorbed in the waveguide, and further, since the relative refractive index difference $\Delta$ is large enough ($\Delta = 4\%$), the waveguide operates as a strongly confined waveguide.

It should be appreciated that the active layer 25 is positioned in the plane of the waveguide 28, the optical coupling between the active layer and the waveguide is accomplished completely. Further, it should be appreciated that the ends of the active layer 25 are tapered as shown in FIG. 8. That tapered ends facilitate further the complete coupling between the optical path and the active layer, and the impedance matching between the waveguide and the active layer. Then, less reflection occurs at the border of the waveguide and the active layer.

Now, the manufacturing process of the optical switch element of FIGS. 8 through 10 is explained. First, the N-type GaAs 23, N-type $Al_xGa_{(1-x)}As$ 24, and the active layer 25 are laminated on the substrate through the conventional crystal growth process. Secondly, the ion plantation is accomplished to the portion of a waveguide 28 by Al ion, and/or As ion, so that the value y becomes 0.2 in the waveguide 28. The ion plantation is performed up to the depth of 0.2 μm. Alternatively, the diffusion process by AlAs can replace the ion implantation, or waveguide layer 28 can be produced by the selective crystal growth process. Thus, the intermediate product is obtained.

Next, the P-type $Al_xGa_{(1-x)}As$ layer 26, and the P-type GaAs layer 27 are grown. Then, in order to provide the desired path of a waveguide, an etching process is accomplished till the depth of the N-type GaAs layer 23 by the conventional reactive sputtering process, to provide the cladding portion (the portion 24' of FIGS. 9 and 10), and then, the cladding layer 24' made of N-type $Al_xGa_{(1-x)}As$ is attached around the switching element portion. Finally, the electrode 16 and the lead wire 17 are attached through the conventional process.

According to the present invention, a plurality of switching elements, and waveguides are mounted on a single semiconductor substrate to provide a switching matrix.

Figure 11A:
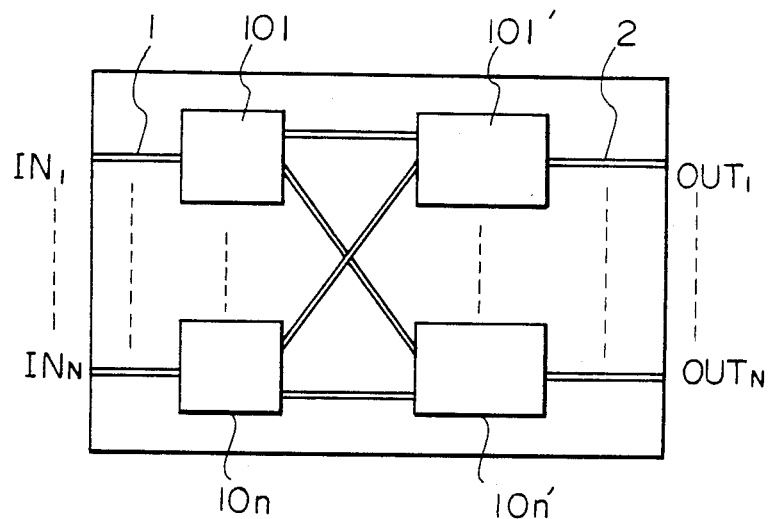

FIG. 11A shows the configuration of the optical switching matrix according to the present invention, in which 101 through 10n are switching assembly each having a plurality of switching elements (101-1, 101-2, 101-n, et al), and optical divider (101a, 102a, ..., 10na), or optical coupler (101'a, 102'a, ..., 10n'a). The optical dividers (101a, 102a, ..., 10na) has a single input branch, which is divided to n number of output branches where n is an integer larger than 2, and the optical couplers (101'a, 102'a, ..., 10n'a) has n number of input branches, and a single output branch. Thus, an input optical signal at an input terminal ($IN_1, ..., IN_N$) is switched to any output terminal ($OUT_1, ..., OUT_N$) by switching the switching elements (101-1, ..., 101-n) by switching an injection current of each switching element.

Figure 11B:
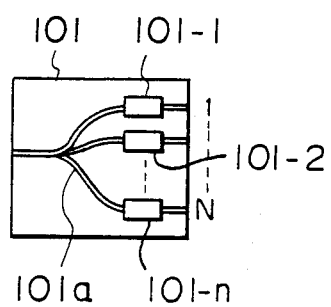
Figure 11C:
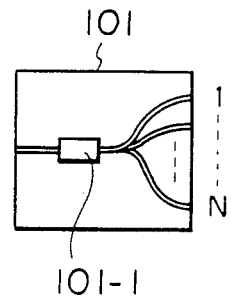

The configuration of FIG. 11B shows the embodiment that an input optical signal is first divided to n number of branches in the switching assembly 101 or 10n, then an optical signal on each branch is switched. Alternatively, the configuration shown in FIG. 11C that an input optical signal is first switched, and then, the switched output is branched to n number of branches.

Figure 12:
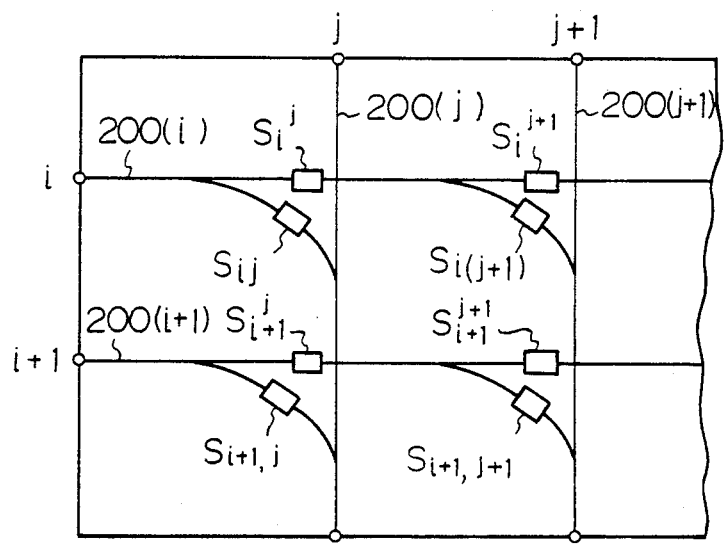
FIG. 12 is another configuration of the optical switches for providing an actual switching matrix.

FIG. 12 is another configuration of the switching matrix according to the present invention, in which a plurality of optical paths (i, i+1, j, j+1 et al) are arranged as if cross bars, and a switching element ($S_{ij}$, $S_j'$, et al) is positioned at each cross point of the crossed optical waveguides. Thus, the input optical waveguide i and the output optical waveguide j are coupled by applying an injection current to the switching element $S_{ij}$. When a switching element at a cross point is not ON, the level of the optical signal is amplified to the desired level by the gain of the switching element $S_j'$. That switching element $S_j'$ can be removed if a switching element $S_{ij}$ functions to provide the desired optical output level. The embodiment of FIG. 12 has the feature that the insertion loss is quite small since no optical divider is used in output waveguides.

Some of the specific advantages of a cross-bar type switching configuration of FIG. 12 are listed below.

(1) As the structure is simple, a large scale equipment may be possible.

(2) Each optical waveguides cross with perpendicular angle with each other, and cross talk level may be low.

(3) As a number of switching elements is small as compared with the configuration having combined unit switching elements, a large scale switching matrix may be manufactured easily.

(4) A control circuit may be simple, as all that is necessary is to turn ON a switching element at the cross point.

(5) It is advantageous in a loss, frequency bandwidth, and high speed switching, since the number of switches in ON state is few.

From the foregoing, it will now be apparent that a new and improved optical switch has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An optical switch element comprising:
   a semiconductor substrate,
   a P-N junction having a P-type semiconductor layer, a N-type semiconductor layer, and an active layer between said P-type semiconductor layer and said N-type semiconductor layer, said P-N junction integral with said semiconductor substrate,
   waveguide means coupled to said active layer for applying an input optical signal to said active layer, and for receiving an output optical signal, and
   means for applying an injection current in the forward direction in said P-N junction for switching ON and OFF an optical signal wherein the wavelength of an input optical signal is close to the center of gain spectrum defined by the structure of said P-N junction, and wherein said injection current when the present switch element is in the ON state is less than oscillation threshold current, and said injection current is zero when the present switch element is in the OFF state.

2. An optical switch element according to claim 1, wherein ends of said active layer are coated so that the reflection coefficient at each end of the active layer is less than 0.1%.

3. An optical switch element according to claim 1, wherein the length of active layer along the path of an optical signal is less than 100 μm.

4. An optical switch element according to claim 1, wherein said injection current for turning ON an optical switching element is in the range between 80% and 90% of threshold current which initiates oscillation operation of said P-N junction.

5. An optical switch element according to claim 1, wherein said active layer faces with the waveguide means through a semiconductor layer.

6. An optical switch element according to claim 1, wherein said active layer is positioned in the plane defined by the waveguide means.

7. An optical switch element according to claim 6, wherein ends of said active layer are tapered.

8. An optical switching element according to claim 1, wherein the waveguide means for coupling external circuit to the optical switching element is produced on the same substrate as that of the switching element.

9. An optical switching matrix having a plurality of input waveguides and a plurality of output waveguides for coupling an input waveguide with a desired output waveguide comprising:
  a plurality of optical switching element assemblies each coupled with an input waveguide or an output waveguide,
  each of said optical switching element assemblies having means for dividing or coupling a single waveguide to a plurality of waveguides, and an optical switching element coupled with a waveguide,
  said optical switching element having a semiconductor substrate, a P-N junction having P-type semiconductor layer and N-type semiconductor layer and an active layer coupled with at least one of said N-type layer and said P-type layer, said P-N junction integral with said semiconductor substrate, means for applying an injection current for switching on and off an optical signal, said active layer being coupled optically with said waveguide of said optical switching element assembly, and wavelength of an optical signal being close to center of gain spectrum defined by the structure of said P-N junction.

10. An optical switching matrix according to claim 9, wherein an optical input signal to each optical switching element assembly passes first said dividing or coupling means and then passes an optical switching element.

11. An optical switching matrix according to claim 9, wherein an optical input signal to each optical switching element assembly passes first an optical switching element and then passes said dividing/coupling means.

12. An optical switching matrix having a plurality of waveguides with a cross bar arrangement, and a plurality of optical switching elements each positioned at each cross point of said cross bar arrangement, said optical switching element having a semiconductor substrate, a P-N junction having P-type semiconductor layer and N-type semiconductor layer and an active layer coupled with at least one of said N-type layer and said P-type layer, said P-N junction integral with said semiconductor substrate, means for applying an injection current for switching on and off an optical signal, said active layer being coupled optically with said waveguide of cross bar arrangement, and wavelength of an optical signal to be switched being close to center of gain spectrum defined by the structure of said P-N junction.

* * * * *